Sept. 4, 1928.
W. G. WILSON
LEAD PIPE SEAL
Filed Sept. 3, 1927
1,682,879
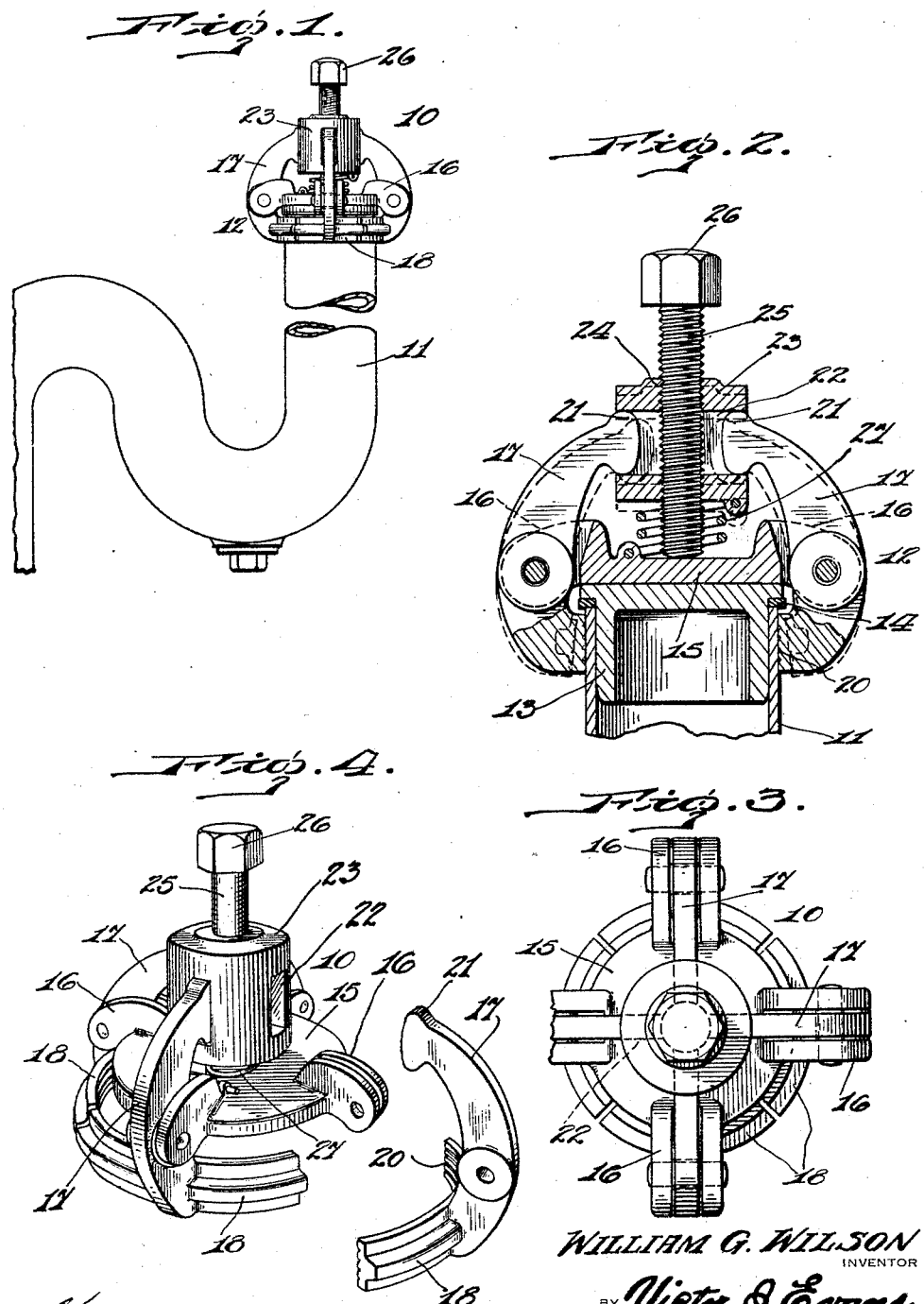
WILLIAM G. WILSON
INVENTOR
BY Victor J. Evans
ATTORNEY Patented Sept. 4, 1928.

1,682,879

UNITED STATES PATENT OFFICE.

WILLIAM G. WILSON, OF WEST NEW BRIGHTON, NEW YORK.

LEAD-PIPE SEAL.

Application filed September 3, 1927. Serial No. 217,399.

This invention relates to improvements in seals and particularly to lead pipe seals.

The primary object of the invention resides in a pipe seal for temporarily sealing the open ends of the lead pipes in a plumbing system during the testing of the system by the authorities to determine the water pressure therein prior to the connection of the appliances thereto. At present it is the practice to bend the walls of the open end of the lead pipe together and apply a sealing composition thereto which necessitates the cutting off of the end of the pipe after the test. This invention may be readily attached or removed without disfiguring the end of the pipe which saves time, labor and material.

Another object is to provide a lead pipe seal including a plug for closing the open end of the pipe and a clamp for applying pressure to the walls of the pipe to compress the same in sealing engagement with said plug.

A further object of the invention is to provide a lead pipe seal which is simple in construction, easy to apply to or remove from a pipe, and which is capable of sealing the pipe against a high pressure within the pipe.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1 is a side elevation of my improved pipe seal in position upon the end of a lead pipe.

Figure 2 is a vertical sectional view therethrough showing the parts in dotted lines when moved to a position to remove the seal from the pipe.

Figure 3 is a top plan view.

Figure 4 is a perspective view of the seal clamping device with one of the clamping jaws in a separated condition.

Referring to the drawings by reference characters, the numeral 10 designates my improved pipe seal in its entirety and which is shown in the drawing as applied to the open end of a lead pipe 11 of a plumbing system. The pipe seal includes a clamping device 12 and a plug or cap 13. The cap 13 fits within the open end of the pipe 11 to close the same and a gasket or washer 14 may be interposed between the end of the pipe and an annular flange formed on the cap.

The clamping device 12 includes a bearing plate 15 which is cast of suitable metal and is provided with diametrically opposed spaced sets of ears 16 which extend outwardly from the bearing plate so as to project beyond the plane of the walls of the pipe. Pivoted between each set of ears 16 are arms 17, the lower end of each arm being formed with a segmental jaw 18, which jaws co-act to substantially encircle the exterior of the pipe 11. The inner face of the jaws 18 are serrated as at 20 for gripping engagement with the exterior of the pipe. The free ends of the arms 17 extend upward and are provided with rounded heads 21, the heads of the respective arms extending into recesses or slots 22 provided in a collar 23. The rounded heads 21 engage the top and bottom walls of the recesses for a purpose to be presently explained. The collar 23 is provided with a threaded bore 24 which receives a threaded stud 25 having a manipulating head 26. The free end of the stud 25 extends through the collar and constantly bears against the bearing plate 15. Interposed between the collar 23 and the bearing plate 15, is a contractile spring 27 which has its opposite ends respectively connected to the collar and the bearing plate. The spring tends to normally pull the collar in the direction of the bearing plate for a purpose now to be described.

In operation, the plug 13 is inserted in the open end of the pipe and the jaws 18 are moved to an expanded position by imparting rotation to the stud 25 which feeds the collar 22 in the direction toward the bearing plate and in so moving, the top and bottom walls of the recesses 22 serve to rock the arms 17 upon their pivots which throws the jaws 18 outwardly. The clamping device may now be placed in position with the bearing plate 15 resting against the outer face of the plug or cap 13. An opposite rotation is now imparted to the threaded stud 25 which causes the collar to be fed outwardly with respect to the stud and in moving outwardly, the walls of the recesses rock the arms 17 in an opposite direction to compress the jaws about the exterior of the pipe on a plane in alignment with the walls of the plug 13. The stud is turned until the jaws are in clamping engagement with the pipe, the pressure of which tends to compress the walls of the lead pipe 11 into sealing engagement with the plug or cap 13 and at the same time, the stud 25 bears against the bearing plate 15 to maintain the plug in a seated position.

From the foregoing description, it will be seen that I have shown and described a lead pipe seal which will eliminate the present practice of sealing the open end of a lead pipe by bending the walls of the pipe together and sealing the same with a sealing compound. A pipe sealed in such a manner can only be opened by sawing off the closed end of the pipe which requires time and labor and loss of material. These pipe seals may be applied to the lead pipes during the test of the plumbing system prior to the joining of the appliances to the system and after the test has been made, the clamping device 12 may be removed and the plug 13 left in the pipe to prevent dirt from entering the same. The plug is later removed when the pipes are connected with the appliances.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In combination with the open end of a lead pipe, a plug extending within said pipe for closing the open end thereof, of a clamping device including a plurality of pivoted jaws for clamping engagement with the exterior wall of said pipe, a collar engaging said jaws for actuating the same, a bearing plate overlying said plug on which said jaws are pivotally mounted, a contractile spring interposed between said collar and said bearing plate, and a stud threaded in said collar and pressing against said bearing plate to hold said plug seated in said plate.

2. A device of the class described including a bearing plate, a plurality of arms pivoted to said plate, a segmental jaw on one end of said arms, a collar having recesses therein for respectively receiving the other ends of said arms, a stud threaded to said collar for bearing engagement with said bearing plate, and a contractile spring interposed between said collar and said bearing plate.

3. A pipe seal clamp comprising a bearing plate, a plurality of oppositely disposed arms pivoted to said bearing plate, rounded heads provided on one of the ends of said arms, arcuate shaped jaws on the other ends of said arms, a collar having recesses therein for receiving the respective rounded heads of said arms, a stud threaded to said collar for bearing engagement with said bearing plate, and a contractile spring interposed between said collar and said bearing plate.

In testimony whereof I have affixed my signature.

WILLIAM G. WILSON.